J. C. MILLER.
BOTTLE FEEDING AND MOVING MECHANISM.
APPLICATION FILED JUNE 13, 1917.
1,336,788.
Patented Apr. 13, 1920.
5 SHEETS—SHEET 3.
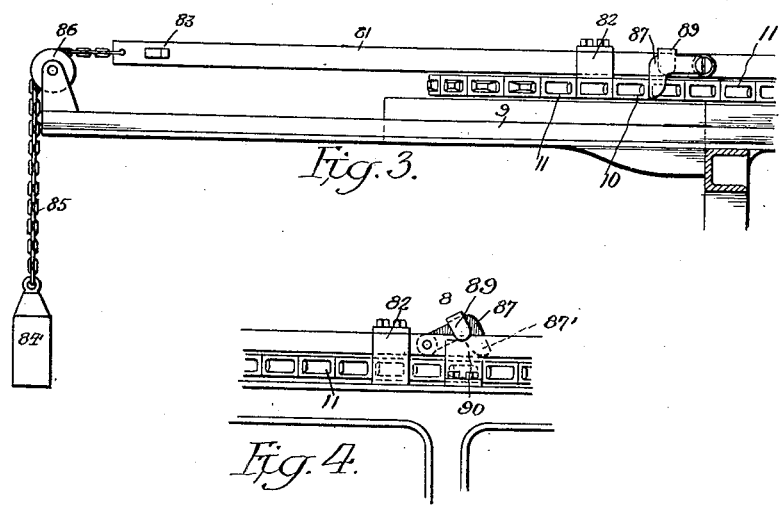
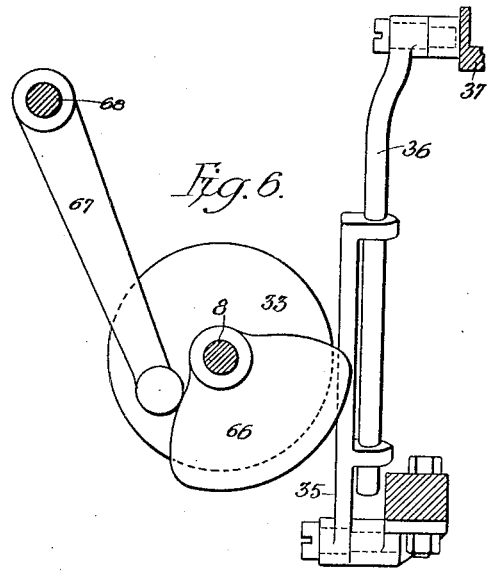
Inventor:
John C. Miller
By Edward R. Alexander
atty J. C. MILLER.
BOTTLE FEEDING AND MOVING MECHANISM.
APPLICATION FILED JUNE 13, 1917.
1,336,788.
Patented Apr. 13, 1920.
5 SHEETS—SHEET 4.
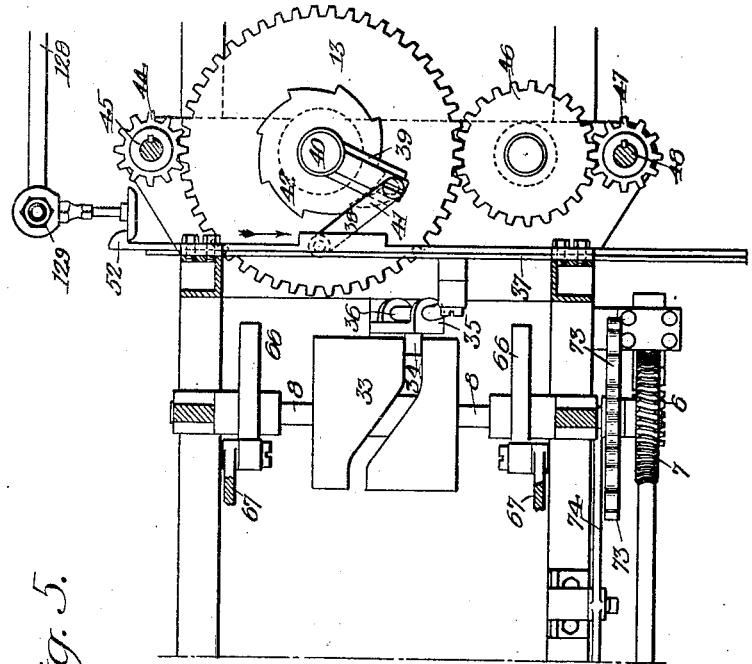
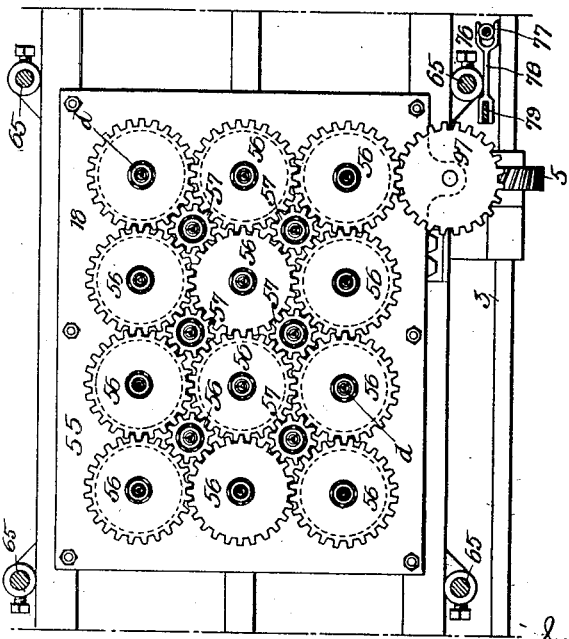
Fig. 5.

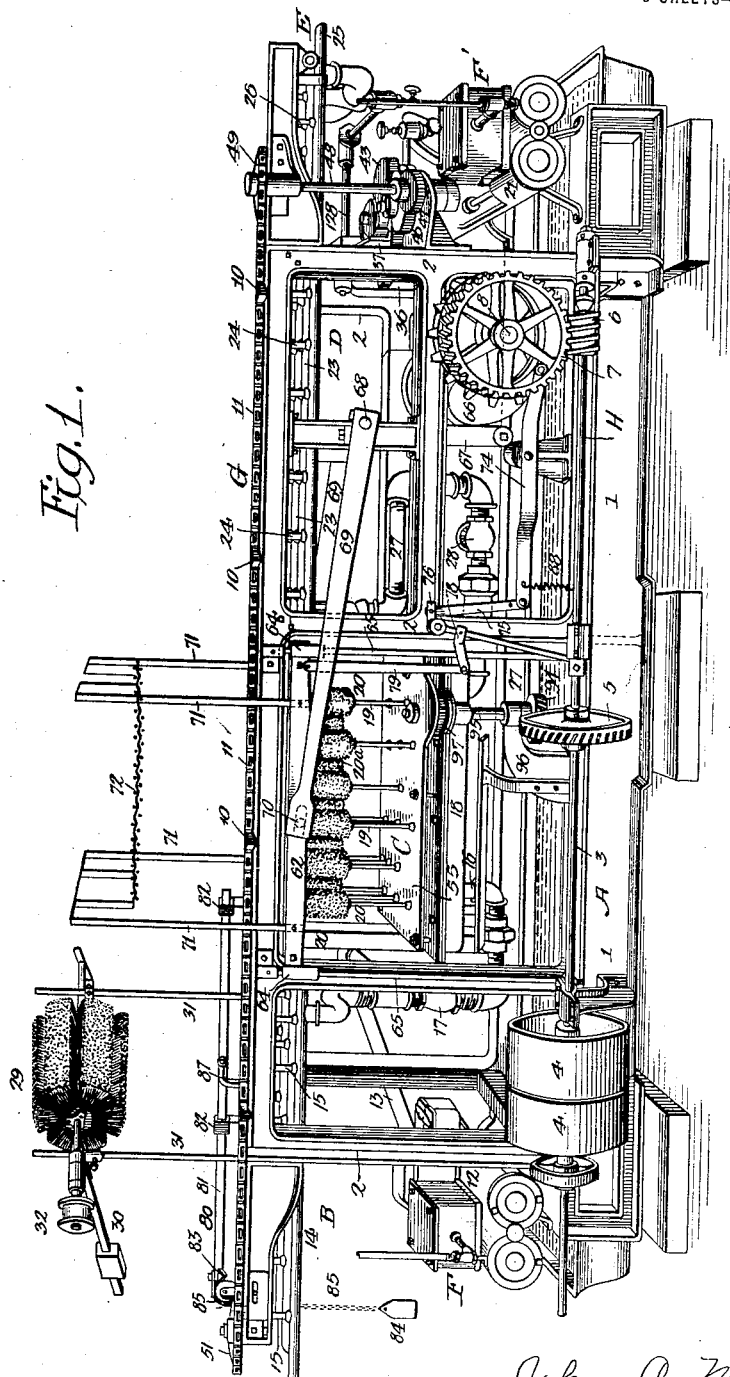

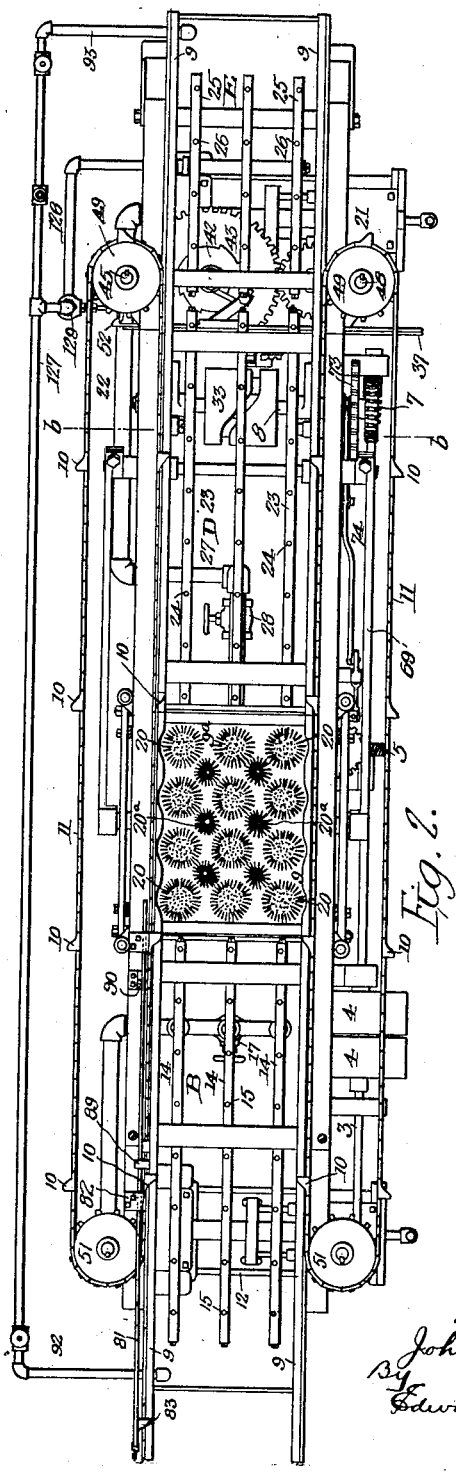

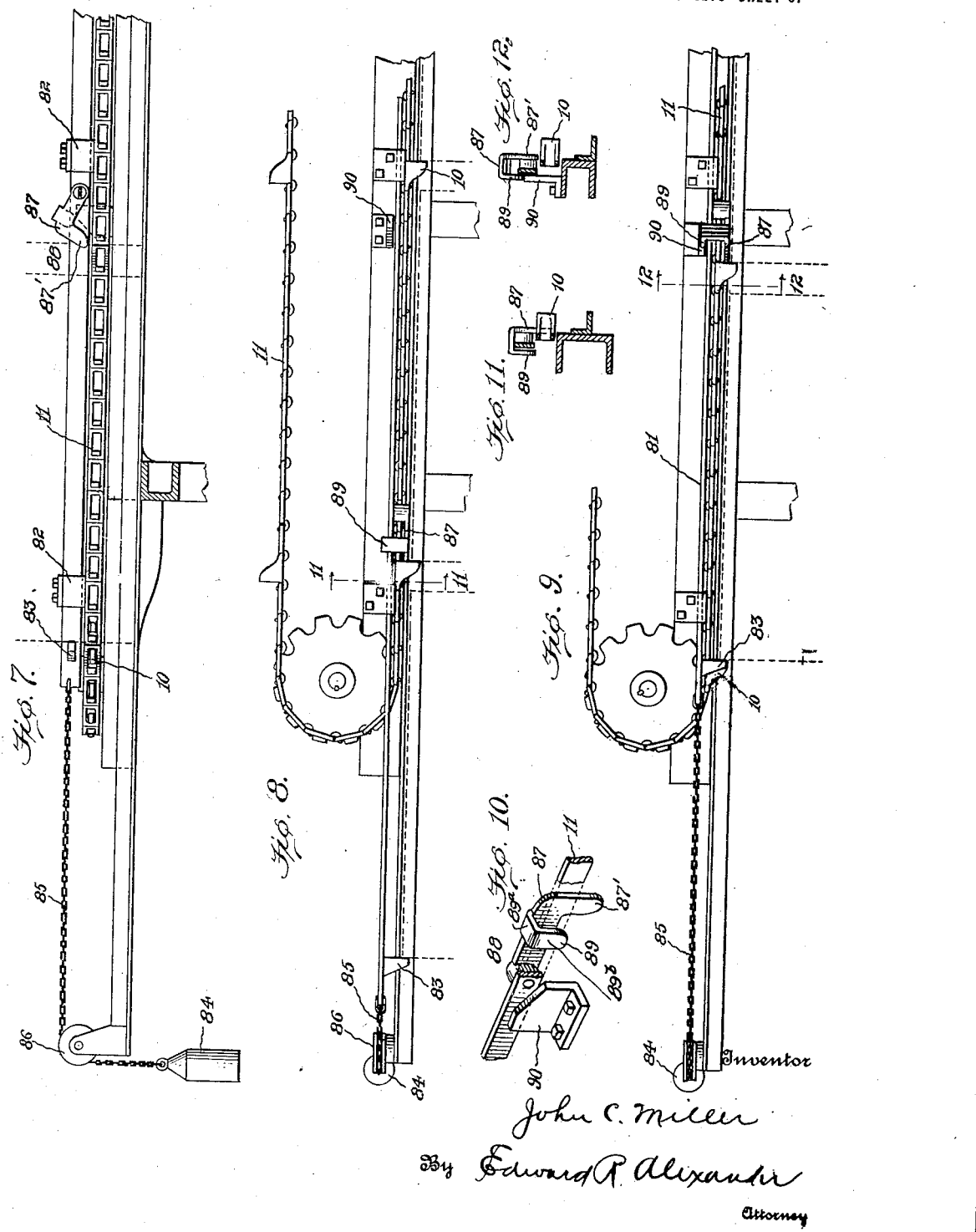

UNITED STATES PATENT OFFICE.

JOHN C. MILLER, OF COVINGTON, KENTUCKY, ASSIGNOR, BY MESNE ASSIGNMENTS, TO THE MILLER PASTEURIZING MACHINE COMPANY, OF CANTON, OHIO, A CORPORATION OF OHIO.

BOTTLE FEEDING AND MOVING MECHANISM.

1,336,788.          Specification of Letters Patent.          Patented Apr. 13, 1920.

Original application filed May 21, 1906, Serial No. 317,918. Divided and this application filed June 13, 1917. Serial No. 174,614.

*To all whom it may concern:*

Be it known that I, JOHN C. MILLER, a citizen of the United States, residing at Covington, in the county of Kenton and State of Kentucky, have invented certain new and useful Improvements in and Relating to Bottle Feeding and Moving Mechanism, of which the following is a specification.

This invention relates to a machine for treating a bottle or bottles in holding devices, such as racks, crates, cases or trays and particularly to the mechanism which controls the delivery and movement of the racks, crates, cases or trays or bottles to and through the apparatus.

One object of the invention is to provide improved means for causing engagement of the bottle holding devices with the moving means therefor.

Another object of the invention is to provide novel means for controlling and feeding the bottle holding devices to the apparatus.

With these and other objects in view, the invention consists of the combination or combinations of elements hereinafter set forth.

This application is a division of my application Ser. No. 317,918, filed May 21, 1906.

For the purpose of illustration, I have, in the accompanying drawings, shown and herein described one form of apparatus embodying my invention. The invention is shown as applied to an apparatus in which the bottles are washed and sterilized.

Figure 1 is a perspective view of a bottle treating machine, constructed in accordance with my invention.

Fig 2 is a top plan view of the machine.

Figs. 3 and 4 are detail views of the means for controlling and feeding the holding devices to the moving means therefor.

Figs. 5 and 6 are detail views of the driving mechanism for the machine.

Fig. 7 is a detail view taken along the longitudinal center line of the machine showing in side elevation one of the feeding members in the position occupied when a holding device has been fed into position to be engaged and moved by the moving means.

Figs. 8 and 9 are top plan views of the parts shown in Fig. 7 showing, respectively, the feeding member in retracted and advanced positions.

Fig. 10 is a detail view of the release element or trigger by means of which the feeding member is actuated by the moving means.

Fig. 11 is a section on line 11—11 of Fig. 8.

Fig. 12 is a section on line 12—12 of Fig. 9.

In the drawings, the principal groups of elements of the machine, as entireties, are represented as follows: A is the main frame of the machine; B is the preliminary or initial washing mechanism; C is the main washing mechanism preferably arranged below the horizontal plane of the preliminary or initial washing mechanism B; D is the rinsing mechanism; G is the conveying system for advancing bottles or groups of bottles through the machine step by step; and H is the power transmitting devices on the machine for effecting the desired coöperation of its various elements.

The machine may have, at the bottom, an oblong rectangular tub or tank 1, which may be divided (see dotted lines, Fig. 1) into two compartments,—one for holding water containing soap or other cleansing material, and the other for holding a rinsing fluid such as clear water.

Mounted upon this tank are opposite side frames 2 which, together with proper cross frames, constitute the main frame A and carry the working elements of the machine.

The power transmitting devices H preferably comprise a main driving shaft 3, which is adapted to suitable bearings at one side of the machine, and has pulleys 4 for receiving a driving belt, the shaft being also provided with an incline-tooth gear 5 and a worm 6. The gear 5 serves to rotate scrubbing brushes 19, 20, with which the machine is provided and the worm 6 meshes with a worm wheel 7 on a transverse shaft 8, which carries suitable cams, referred to hereinafter, whereby movement is imparted to the other elements of the machine.

The bottle or bottles to be washed are placed in an inverted position in suitable holding devices, such as cases, racks or trays (hereinafter, for convenience termed "racks"). 9 indicates guideways or tracks mounted on the frame A above the washing, rinsing and sterilizing mechanisms. The guideways extend from end to end of the machine and serve to properly guide, support and direct the bottle-carrying racks therethrough.

11 indicates a pair of endless chains which are arranged at opposite sides of the frame A and form part of the conveying system G. The chains 11 preferably extend in a horizontal plane slightly above the guideways 9. The chains 11 are provided with laterally projecting studs 10, which are uniformly spaced thereon. Each chain 11 is supported by and runs around sprocket wheels 49, 51, to which reference will later be made, arranged near the opposite ends of the machine. The inner or adjacent runs of the chains 11 are disposed close and parallel to the guideways 9 so that the studs will project over the guideways and engage the rear ends of the bottle racks.

At one end of the base tank 1 of the machine is a pump 12, which draws soapy water from one compartment of the tank and forces it through a pipe 13, in communication with the preliminary or initial washing mechanism B. This mechanism preferably comprises a series of longitudinal pipes 14, located between the rails 9 at the receiving end of the machine, each of said pipes having upwardly projecting nozzles 15, which are so disposed with reference to the disposition of the bottles in the carrying racks that when a rack is in a position of rest on first entering the machine, there will be a nozzle in line with the mouth of each bottle in said rack.

The pipe 13 is also in communication, through a branch 16, having a valve 17, with the main washing mechanism C.

At the opposite end of the tank 1 is another pump 21 which draws clean water from the tank and discharges the same through a pipe 22, connected, by suitable branches, with the rinsing mechanism D. The rinsing mechanism preferably comprises a series of longitudinal pipes 23 located between the rails 9 and each provided with projecting nozzles 24 so disposed that each of them will be in line with the mouth of a bottle when the rack containing the same reaches a position of rest in its further passage through the machine, the jets of clean water from said nozzles 24 thus serving to rinse the previously washed bottles. As shown in the drawings, the pipes 23 are provided with twice as many spaced nozzles 24 as there are bottles contained in a single rack so that each group or rack of bottles receives a preliminary and a final rinsing after being subjected to the main washing or scrubbing mechanism C.

Longitudinally beyond the pipes 23 is the sterilizing and drying mechanism E comprising a set of pipes 25, with nozzles 26. The pipes 25 are in connection with a steam pipe 127 through a branch 128 having a valve 129 which is intermittently operated, as described hereafter, so as to provide for the projection at certain times, of jets of steam from the nozzles 26 into bottles supported above them, thereby effecting the sterilization and drying of the previously washed and rinsed bottles.

The pipe 22 has a branch 27 leading to the main washing mechanism C and provided with a valve 28, hence by proper manipulation of the valves 17 and 28 either soapy water or clear water or a mixture of the two can be directed to the main washing mechanism.

Located above the rails 9 at the receiving end of the machine may be arranged suitable means for cleaning the bottoms of the bottles as they are moved through the apparatus. These means preferably comprise a transversely arranged rotary brush, the shaft of which is mounted in bearings carried by a forked and counterweighted lever 30 hung upon suitable bearings on vertical posts 31, said brush shaft having a pulley 32 for receiving a belt whereby it may be rotated.

Of the mechanism G for imparting intermittent movement to the driving chains 11, 33 is a grooved cam which acts upon a stud 34 on a swinging yoke 35, which, as shown in Figs. 5 and 6, is preferably pivoted at its lower end to one of the cross bars of the frame. 36 is a bar mounted on the yoke 35 so as to be free to slide vertically in the forks thereof. The bar 36 is pivotally connected at its upper end to a transverse slide bar 37, which is suitably mounted in and guided by bearings on the opposite side frames 2 of the machine 1. 38 indicates a link which connects the slide bar to the outer or free end of an arm 39, which in turn is swingably connected at its inner end upon a vertical shaft 40. 41 indicates a pawl carried by the arm 39 for engaging with the teeth of a ratchet wheel 42 secured to said shaft 40.

The shaft 40 is provided with a spur wheel 43, which meshes with a spur pinion 44 on a vertical shaft 45, and said spur wheel 43 also drives, through the medium of an interposed spur wheel 46, a spur pinion 47 on a vertical shaft 48.

The shafts 45 and 48 are adapted to suitable bearings in the opposite side frames 2 of the machine, and each of said shafts is provided, at its upper end, with a chain wheel 49, one of these wheels engaging the chain 11 at one side of the machine, and the other engaging the chain 11 at the opposite side of the machine, as already described.

Suitable means are provided for opening and closing the valve 129 in the steam pipe 128 at predetermined intervals for supplying steam to the sterilizing and drying mechanism E at the time when a group of bottles is in position above such mechanism. The means chosen for illustration in the drawings will be described as follows:

The transverse slide 37 is provided, at one end, with a hook 52 which, as the slide is approaching the limit of its movement in the direction of the arrows, Fig. 5, engages with the handle of the valve 129 (which is preferably a self-closing valve) to open it for a limited time to permit communication between the steam pipe 127, and the branch pipe 128 which is connected to the pipes 25, thus supplying steam to the nozzles 26, which supply, however, is cut off as soon as the slide 37 has completed a predetermined portion of its return movement.

The main washing mechanism C preferably comprises a water tank, head or chest 18 and a series of washers or scrubbing devices, such as the brushes 20 for cleaning the interiors of the bottles. These brushes are preferably combined with intervening scrubbing devices, such as brushes 20$^a$, for cleansing the exteriors of the bottles.

The present machine is designed for use in connection with a rack carrying twelve bottles arranged in three rows of four each; hence there are twelve main brushes 20 correspondingly disposed, and six intermediate brushes 20$^a$ disposed in two rows of three each, so that each of said intermediate brushes will act upon the exterior portions of four bottles, as will be understood upon reference to Fig. 2.

Each of the brush spindles 19 is secured at its lower end to a tubular sleeve which is mounted in a bearing in the top plate of the chest 18, and in a bearing in a plate 55 above the same and spaced therefrom. Between the plate 55 and the chest 18 each sleeve is provided with a spur wheel 56 or 57, (see Fig. 5), the spur wheels 56 corresponding with the brushes 20, intermeshing with each other, but the spur wheels 57 corresponding with the brushes 20$^a$ meshing only with certain of the spur wheels 56, since it is manifest that said spur wheels 57 cannot mesh with all of the spur wheels 56 because of the contrary directions in which the latter run. All of the spur wheels 57, therefore, have the upper portions of their teeth cut away and those of the spur wheels 56, which it is not desired to mesh with the spur wheels 57 have the lower portions of their teeth cut away, so that the spur wheels 57 mesh only with those spur wheels 56, which have full teeth.

Each of the brushes 20 may consist of spirally disposed brush fiber and the spindle may be perforated at points between the convolutions of the brush material. Each brush 20 may have at its upper end an outwardly flaring ring of brush material and a central perforation to supply the same with cleaning fluid. This form of construction insures thorough scouring of the interior of the bottle both on the sides and bottom, the flaring ring insuring access of the brush material to the annular recess or depression formed where the sides and bottom of the bottle join each other.

The brushes 20$^a$ may be constructed in a similar manner except that the ring of brush material may be omitted, since it would, in the brush 20$^a$, serve no useful purpose.

The brush-carrying chest 18 has no vertical movement. As the said head or chest 18 and the scrubbing devices carried thereby are arranged in a horizontal plane below the plane of the preliminary or initial washing mechanism B and the rinsing and sterilizing mechanisms D and E, it becomes necessary to raise and lower the bottles in order to permit of the entry of the brushes into them and of the proper action of the brushes thereon. For this reason that portion of each of the rails 9 which is adjacent to or above the brushes is disconnected from the remaining portions of said rails 9, these disconnected portions of the rails being united by transverse bars 9$^a$, so as to form a frame which can be raised and lowered, and upon which each of the bottle carrying racks comes to rest for a time at a certain point in its travel through the machine. This primary frame or elevator normally rests upon suitable plates pivotally mounted upon a secondary rectangular frame 62, comprising side bars and transverse rods, said frame 62 having at its corners bosses 64 which are guided upon vertical posts or rods 65 forming part of the fixed framework A of the machine.

Rising and falling movement is imparted to the secondary frame by means of cams 66 on the cam shaft 8. Each cam acts upon an anti-friction roller on an arm 67, which is secured to a rock shaft 68 mounted in a bearing on one of the side frames 2 of the machine, said rock shaft having another arm 69, which is slotted at its outer end for engagement with a projecting pin 70 on one of the side bars of the secondary frame 62, the inner end of this pin serving as a pivot for the plate.

When a tray has been pushed on to the primary frame the latter with the rack containing the inverted bottles is lowered by the descent of the secondary frame 62, so that the vertically projecting brushes 20 enter the bottles and the brushes 21ᵃ rise between the same.

The bottles are rotated by frictional contact with the brushes 20, but at a slower rate of speed than the brushes themselves, each brush 20 acting upon all parts of the interior of its respective bottle and each brush 20ᵃ acting upon the exterior of each bottle, with which it is in contact.

In order to prevent the bottles from being lifted from the rack by the upward push of the brushes thereon, the secondary frame has at each side vertical bars 71, which are preferably bent inwardly and downwardly at their upper ends, so as to be free from engagement with the side frames of the machine, the inner ends of these bars carrying a device 72, which, by contact with the bottoms of the bottles, serves to retain the same in their proper vertical position.

In order to insure contact between the brushes and all parts of the interior of each bottle, it is advisable to tip or tilt the bottles while the brushes are acting upon them, and for this reason the primary frame is mounted upon the pivoted plates.

The tilting movement of the frame is effected by means of a toothed wheel 73 on the shaft 8 in the following manner:

The wheel 73 acts upon one arm of a lever 74, which is mounted on a suitable stud on the adjacent side frame 2 of the machine, the other arm of said lever 74 being acted on by a spring 88, and connected by a link 75, to one arm of a bell crank lever 76, which is likewise mounted on a stud on the adjacent side frame 2 of the machine, the other arm of said lever receiving a sliding block 77, to which is pivotally connected one end of a forked link 78. The opposite end of the link 78 is pivotally connected to an arm 79 which in turn is secured to one of the adjacent secondary frame cross bars mounted to rock in bearings on the side bars of the secondary frame 62. On this rock or cross bar are suitable devices which act upon one of the adjacent cross bars 9ᵃ of the primary frame, so as to raise and lower the adjacent end thereof and consequently impart a tipping or tilting movement to the frame, and hence to the bottle tray and the bottles contained therein.

The teeth of the wheel 73 are so disposed that tipping or tilting movement of the bottle-supporting frame takes place only when the brushes are in the bottles.

80 indicates as an entirety the mechanism for preliminarily feeding, delivering or introducing bottle racks to the machine and the moving means G for the racks. The feeding mechanism 80 coöperates with the moving means G, and is preferably operated and controlled thereby, to insure positioning of the racks for engagement with the moving devices 10 according to their spaced relationship to each other and movement. Of this feeding mechanism, 81 indicates an element preferably comprising a bar which may be mounted to slide endwise in brackets 82. The brackets 82 are fixed in any well known manner to one of the side frames 2 and extend upwardly so as to support the bar 81, slightly above, at one side of and parallel to the adjacent guideway 9. The brackets 82 are preferably formed with alined openings, of a size and shape to receive and guide the bar 81 and permit it to freely slide endwise or parallel to the direction of movement of the bottle racks on the guideways 9. 83 indicates a device or finger fixed to the bar 81 at or near its rear end and projecting laterally to a position for engagement with each bottle rack when the latter is placed on the guideways 9. 85 indicates a chain or cord connected at one end to the rear end of the bar 81 and passing over a sheave or pulley 86. 84 indicates a weight connected to the opposite end of the cord 83 and acting therethrough to maintain the bar 81 in its rearward position or to draw it rearward whenever it is moved forward to feed a rack into position for engagement by the moving means G. As shown in the drawings, the guideways 9 extend forward in front of the chains 11, a considerable distance, as shown in Fig. 3 to permit the positioning of a bottle rack thereon in front of the chains 11 but behind the rack engaging member 83. 87 indicates a release element or trigger pivotally connected to the bar 81. The trigger 87 is arranged at such point on the bar 81, when the latter is in its rearward or normal position that it will be engaged by one of the rack moving devices 10 as the latter passes around the adjacent sprocket wheel 50. The trigger 87 has an arm 87′ which extends downwardly into the path of movement of and for engagement by the rack moving devices 10. By the engagement of a rack moving device 10 with the trigger arm 87′, it and the bar 81 will be moved forward by the said device. If, prior to the engagement of the moving device 10 with the trigger 87, a rack has been positioned on the guideways 9 behind the finger 83, it will be moved forward on the guideways 9 to a position between the inner runs of the chains 11 ready to be engaged by a pair of rack moving devices 10 as the chains 11 operate.

88 indicates means for releasing the trigger 87 from the adjacent moving device 10 to permit the bar 81 to return to normal position under the influence of the weight 84. The release means 88 are arranged to operate after the bar 81 has moved the rack forward sufficiently far for it to be engaged by the moving devices 10. The releasing means 88 preferably comprise an element 89 carried by the trigger 87 and an element 90 carried by the adjacent side frame 2, one of these elements, for instance the element 90, preferably being cam-shaped. The cam 90 is fixed in any well known manner to the side frame 2 at that position which will operate the trigger 87 and release its arm 87' from the adjacent moving device 10 at the proper time, as already explained. The release element 89 is preferably formed integral with the trigger 87, extends laterally therefrom as shown at 89ª, and is then bent downwardly at 89ᵇ for engagement with the cam 90. The cam 90 is arranged in the path of movement of the downwardly extending member 89ᵇ of the release element 89 so that the latter will ride up the cam surface of the cam and release the trigger 87 from the moving device 10, as shown in Fig. 4. As soon as the trigger 87 has been released, the weight 84 will return the bar 81 to its normal position ready for moving another rack forward, leaving the previous rack in position to be engaged by succeeding devices 10 on the feed chains 11.

In order to heat the water contained in either compartment of the base tank the steam pipe 127 has valved branches 92 and 93 extending to the opposite ends of the tank as shown in Fig. 2.

Motion is transmitted to the rotary scrubbing brushes of the machine from the incline-tooth gear 5 on the primary shaft 3, said gear 5 meshing with a similar gear 94 at the lower end of a vertical shaft 95, which is mounted in suitable bearings in a bracket and in the chest 18 and top plate 55, said shaft 95 having a spur wheel 97, which meshes with one of the spur wheels 56, as shown in Fig. 4.

It will be evident that many modifications of the machine can be made without interfering with the general structure and purpose of the same, hence I wish to be understood that my disclosures and the description herein are purely illustrative and are not intended to be in any sense limiting, as widely differing embodiments and applications of the invention will suggest themselves to those skilled in the art without departing from the spirit and scope thereof.

No claim is made herein to the means for intermittently moving the bottle racks and the operating mechanism therefor, that being the subject matter of a companion case Serial No. 174,613.

What I claim is:

1. The combination of a support over and along which racks of articles are moved, rack advancing mechanism movable substantially parallel to said support for moving the racks therealong, a supplemental device movable substantially longitudinally of said support for moving each rack into position for engagement by said advancing mechanism, connections between said supplemental device and said advancing mechanism for moving it in one direction, and separate means for moving said supplemental device in the opposite direction.

2. In apparatus of the class described, the combination of a support along which racks of articles are movable, means for advancing the racks along said support, a member mounted to move longitudinally of said support and provided with means for engaging and moving a rack therealong, a release element on said support, and an element pivoted to said member and provided with two devices, one of which is engaged by said moving means to connect said element thereto and the other of which is arranged to engage said release element to disconnect the other device from said moving means.

3. The combination of a support for bottle racks, means for moving the racks on the support, means operated by the rack-moving means for feeding a rack into engagement therewith, and means for releasing the feeding means from the rack moving means.

4. In a bottle treating machine, the combination of a support for bottle racks, means for intermittently feeding the bottle racks along said support, a supplemental feeder for feeding each rack into position for engagement by said intermittent feeding means, a trigger serving as a connection between said supplemental feeder and said feeding means, whereby the latter actuates said supplemental feeder, and means for operating said trigger when said supplemental feeder reaches a predetermined position to disconnect it from said feeding means.

5. The combination of a support for bottle racks, a chain having members adapted to engage the bottle racks for feeding them along the support, a supplemental feeder having means arranged to engage the bottle racks and the chain and serving to advance said racks into position to be engaged by succeeding members, and devices for detaching said engaging means from the feed chain.

6. In a machine of the class described, the combination of a support along which racks of bottles are moved, means for moving said racks along said support, means actuated by said moving means for feeding each rack into position for engagement thereby, and means for releasing the feeding means from said rack moving means.

7. In a machine of the class described, the combination of a support along which racks of bottles are moved, means for moving said racks along said support, means actuated by said moving means for feeding each rack into position for engagement thereby, and cam operated means for releasing the feeding means from said rack moving means.

8. In a machine of the class described, the combination of a support along which racks of bottles are moved, means for moving said racks along said support, means, including a pivoted element arranged to detachably engage said moving means, for feeding each rack into position for engagement by said moving means, and a device for operating said pivoted element to detach the rack feeding means from said rack moving means.

9. In a machine of the class described, the combination of a support along which racks of bottles are moved, means for moving said racks along said support, a bar mounted to slide longitudinally of said support, a device carried by said bar and arranged in the path of movement of said rack moving means and actuated thereby to slide the bar in one direction, a member carried by said bar for engaging with a bottle rack to move the latter forwardly on said support into position to be engaged by said moving means, and means for releasing said device from the rack moving means when the rack has been moved into position for engagement by the latter.

10. In a machine of the class described, the combination of a support along which racks of bottles are moved, means for moving said racks along said support, a bar mounted to slide longitudinally of said support, a device carried by said bar arranged in the path of movement of said rack moving means and actuated thereby to slide the bar in one direction, a member carried by said bar for engaging with a bottle rack to move the rack forwardly on said support into position to be engaged by said moving means, means for releasing said device from the rack moving means when the rack has been moved into position for engagement by the latter, and means for returning the bar to normal position.

11. In apparatus of the class described, the combination of a support along which racks of bottles are moved, an endless chain carrying uniformly spaced lugs each adapted to engage with the rack and move it along said support, a member mounted to move longitudinally of said support and provided with a device arranged to be engaged by one of the rack moving lugs, an element carried by said longitudinally movable member arranged to engage a rack and move it along said support into position for engagement by a rack moving lug, and means for releasing the said device from the adjacent lug when the rack has been positioned for engagement by a succeeding rack moving lug.

In testimony whereof I have hereunto signed my name.

JOHN C. MILLER.